US010762238B2

(12) United States Patent
Al-Kabra et al.

(10) Patent No.: US 10,762,238 B2
(45) Date of Patent: Sep. 1, 2020

(54) ASCERTAINING NETWORK DEVICES USED WITH ANONYMOUS IDENTIFIERS

(71) Applicant: T-Mobile USA, Inc., Bellevue, WA (US)

(72) Inventors: Rami Al-Kabra, Bothell, WA (US); Prem Kumar Bodiga, Bellevue, WA (US); Noah Dahlstrom, Bellevue, WA (US); Ruchir Sinha, Newcastle, WA (US); Jonathan Morrow, Seattle, WA (US); Aaron Drake, Sammamish, WA (US); Chuong Phan, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 157 days.

(21) Appl. No.: 15/801,971

(22) Filed: Nov. 2, 2017

(65) Prior Publication Data

US 2019/0130133 A1    May 2, 2019

(51) Int. Cl.
| | |
|---|---|
| *G06F 17/30* | (2006.01) |
| *G06F 21/62* | (2013.01) |
| *H04L 29/06* | (2006.01) |
| *H04L 29/08* | (2006.01) |
| *H04W 12/02* | (2009.01) |
| *G06Q 30/02* | (2012.01) |

(52) U.S. Cl.
CPC ...... *G06F 21/6254* (2013.01); *H04L 63/0421* (2013.01); *H04L 67/02* (2013.01); *H04L 67/22* (2013.01); *H04L 69/22* (2013.01); *H04W 12/02* (2013.01); *G06Q 30/0267* (2013.01); *G06Q 30/0277* (2013.01); *H04L 63/168* (2013.01)

(58) Field of Classification Search
USPC .......................................................... 726/27
See application file for complete search history.

(56) References Cited

U.S. PATENT DOCUMENTS

| | | | | |
|---|---|---|---|---|
| 7,748,028 | B2* | 6/2010 | Sato | H04L 63/0407 726/5 |
| 8,856,944 | B2* | 10/2014 | Clift | G06F 21/6263 726/26 |
| 9,608,986 | B2* | 3/2017 | Ogawa | G06F 21/31 |
| 9,774,594 | B2* | 9/2017 | Gatto | H04L 67/22 |
| 2008/0033740 | A1* | 2/2008 | Cahn | G06Q 10/00 726/2 |
| 2008/0092242 | A1* | 4/2008 | Rowley | H04L 63/1483 726/27 |
| 2009/0300066 | A1 | 12/2009 | Guo et al. | |
| 2011/0030043 | A1 | 2/2011 | Jones et al. | |
| 2016/0234203 | A1 | 8/2016 | Gatto et al. | |

(Continued)

OTHER PUBLICATIONS

International Search Report and Written Opinion for PCT Application No. PCT/US2018/059078, dated Feb. 13, 2019, 13 pages.

*Primary Examiner* — Amare F Tabor
(74) *Attorney, Agent, or Firm* — Han Santos, PLLC (57) ABSTRACT

Techniques for identifying certain types of network activity are disclosed, including parsing network traffic to automatically recognize anonymous identifiers. Such techniques may be used to identify and eliminate malicious and/or undesirable network traffic, and to identify topics relevant to a user of a particular network device so that communications to such a user are more likely to relate to a topic of interest to the user.

20 Claims, 6 Drawing Sheets

(56) References Cited

U.S. PATENT DOCUMENTS

2017/0013070 A1* 1/2017 Comstock ............... H04L 67/22
2017/0287012 A1 10/2017 Barz et al.
2018/0285467 A1* 10/2018 Ohara ................... G06F 3/1273

* cited by examiner

ASCERTAINING NETWORK DEVICES USED WITH ANONYMOUS IDENTIFIERS

BACKGROUND

Electronic device manufacturers have implemented various techniques to assist in documenting and tracking electronic devices, including storing accessible device identifiers in device memory. Typically, such identifiers were simply a specific serial number permanently associated with the electronic device. There are advantages to having such a device-specific identifier, but as technology developed, such identifiers proved to be a vehicle by which most advertising companies profiled cellular telephone users for marketing purposes. Over time, issues were raised about provision of device identifiers to marketing companies without a device user's permission. In response, some device manufacturers began using advertisement identifiers, which could be changed by a device user and, therefore, was not permanently linked to an electronic device.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Overview

This disclosure is directed to techniques for ascertaining network devices that are used with anonymous identifiers. Because the anonymous identifiers are anonymous, techniques are also disclosed for identifying character strings as anonymous identifiers. The character strings that contain anonymous identifiers are included in network traffic between a network device and remote server that is in communication with the network. In at least one implementation, the network device is a cellular user device, such as a cell phone or a cellular-enabled tablet computer, and the network is a cellular network. Also, in at least one implementation of the techniques described herein, the anonymous identifiers are advertising identifiers commonly used in network communications. However, the described techniques are limited to such implementations.

The presently described techniques may be used to identify advertising identifiers to detect malicious activity and thereby improve network performance and user experience. Advertising identifiers identified by way of one or more technique described herein may also be used to identify users having an interest in a particular subject and providing specific content to individual users through network devices employed by the users.

In general, communications over a network by a network device are monitored and URLs (Uniform Resource Locators) are detected and parsed. Character strings having a particular format are extracted and examined using certain techniques to verify that a character string is an anonymous identifier. When an anonymous identifier is verified, a unique device identifier associated with a device transmitting the URL data is associated with the anonymous identifier. Hence, a particular anonymous identifier can be connected with a particular device.

Network traffic from a network device so identified can also be parsed to determine particular interests of a user employing the network device. User interests, so determined, can be stored in association with the device identifier and the anonymous identifier. When an entity desires to locate users having interests in a specified topic, topics can be searched to find devices associated with the specified topic. Content tailored to the specific topic can then be communicated to the device, either directly or indirectly. If an anonymous identifier is also known, then content tailored to the specific topic can be transmitted to a device associated with the anonymous identifier. In this way, a user's personal identifying information is not exposed to an entity wishing to deliver tailored content to the user.

Details regarding the novel techniques reference above are presented herein are described in detail, below, with respect to several figures that identify elements and operations used in systems, devices, methods, computer-readable storage media, etc. that implement the techniques.

Example Network Environment

Figure 1:
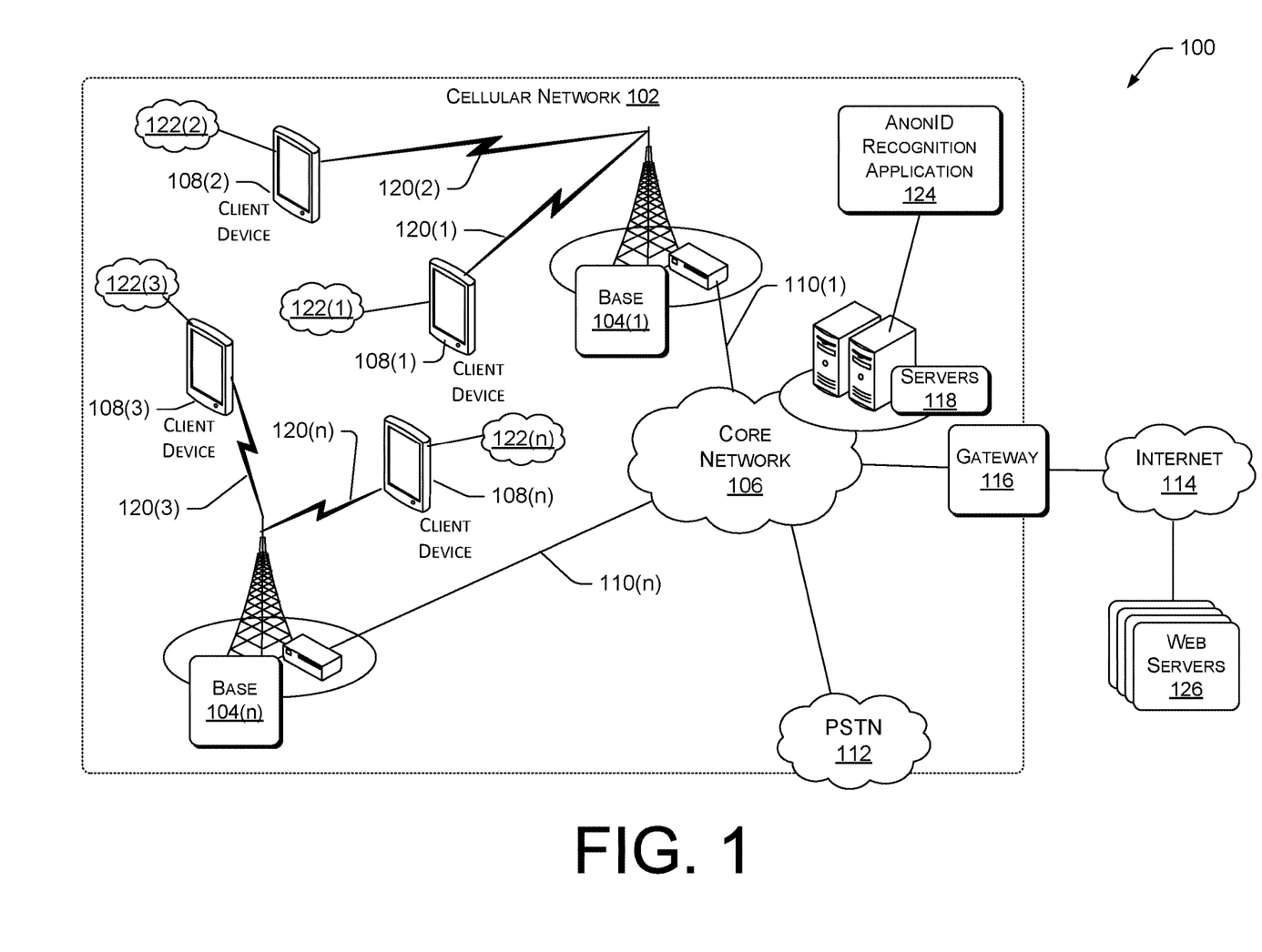
FIG. 1 is a diagram of an example cellular network environment in which the technological solutions described herein may be implemented.

FIG. 1 is a diagram of an example cellular network environment 100 in which the technological solutions described herein may be implemented. FIG. 1 illustrates the concept of ascertaining network devices used with anonymous identifiers. It is noted that, although the present discussion refers to a cellular network, other network architectures may be used in place of the cellular network shown and described with respect to FIG. 1.

The cellular network environment 100 includes a cellular network 102 that is provided by a wireless telecommunication carrier. The cellular network 102 includes cellular network base stations 104(1)-104(n) and a core network 106. Although only two base stations are shown in this example, the cellular network 102 may comprise any number of base stations. The cellular network 102 provides telecommunication and data communication in accordance with one or more technical standards, such as Enhanced Data Rates for GSM Evolution (EDGE), Wideband Code Division Multiple Access (W-CDMA), HSPA, LTE, LTE-Advanced, CDMA-2000 (Code Division Multiple Access 2000), and/or so forth.

The base stations 104(1)-104(n) are responsible for handling voice and data traffic between client devices, such as client devices 108(1)-108(n), and the core network 106. Each of the base stations 104(1)-104(n) may be communicatively connected to the core network 106 via a corresponding backhaul 110(1)-110(n). Each of the backhauls 110(1)-110(n) are implemented using copper cables, fiber optic cables, microwave radio transceivers, and/or the like.

The core network 106 also provides telecommunication and data communication services to the client devices 108

(1)-108(n). In the present example, the core network 106 connects the user devices 108(1)-108(n) to other telecommunication and data communication networks, such as a public switched telephone network (PSTN) 112, and the Internet 114 (via a gateway 116). The core network 106 includes one or more servers 118 that implement network components. For example, the network components (not shown) may include a serving GPRS support node (SGSN) that routes voice calls to and from the PSTN 112, a Gateway GPRS Support Node (GGSN) that handles the routing of data communication between external packet switched networks and the core network 106 via gateway 116. The network components may further include a Packet Data Network (PDN) gateway (PGW) that routes data traffic between the GGSN and the Internet 114.

Each of the client devices 108(1)-108(n) is an electronic communication device, including but not limited to, a smartphone, a tablet computer, an embedded computer system, etc. Any electronic device that is capable of using the wireless communication services that are provided by the cellular network 102 may be communicatively linked to the cellular network 102. For example, a user may use a client device 108 to make voice calls, send and receive text messages, and download content from the Internet 114. A client device 108 is communicatively connected to the core network 106 via base station 104. Accordingly, communication traffic between a client device 108(1)-108(n) and the core network 106 are handled by wireless interfaces 120(1)-120(n) that connect the client devices 108(1)-108(n) to the base stations 104(1)-104(n).

Each of the client devices 108(1)-108(n) are also capable of connecting to an external network, including the Internet, via a wireless network connection other than the cellular network wireless services. As shown, client device 108(1) includes a connection to network 122(1), client device 108(2) includes a connection to network 122(2), client device 108(3) includes a connection to network 122(3), and client device 108(n) includes a connection to network 122(n). The wireless connections are made by way of any method known in the art, such as Bluetooth®, WiFi, Wireless Mesh Network (WMN), etc.

Figure 2:
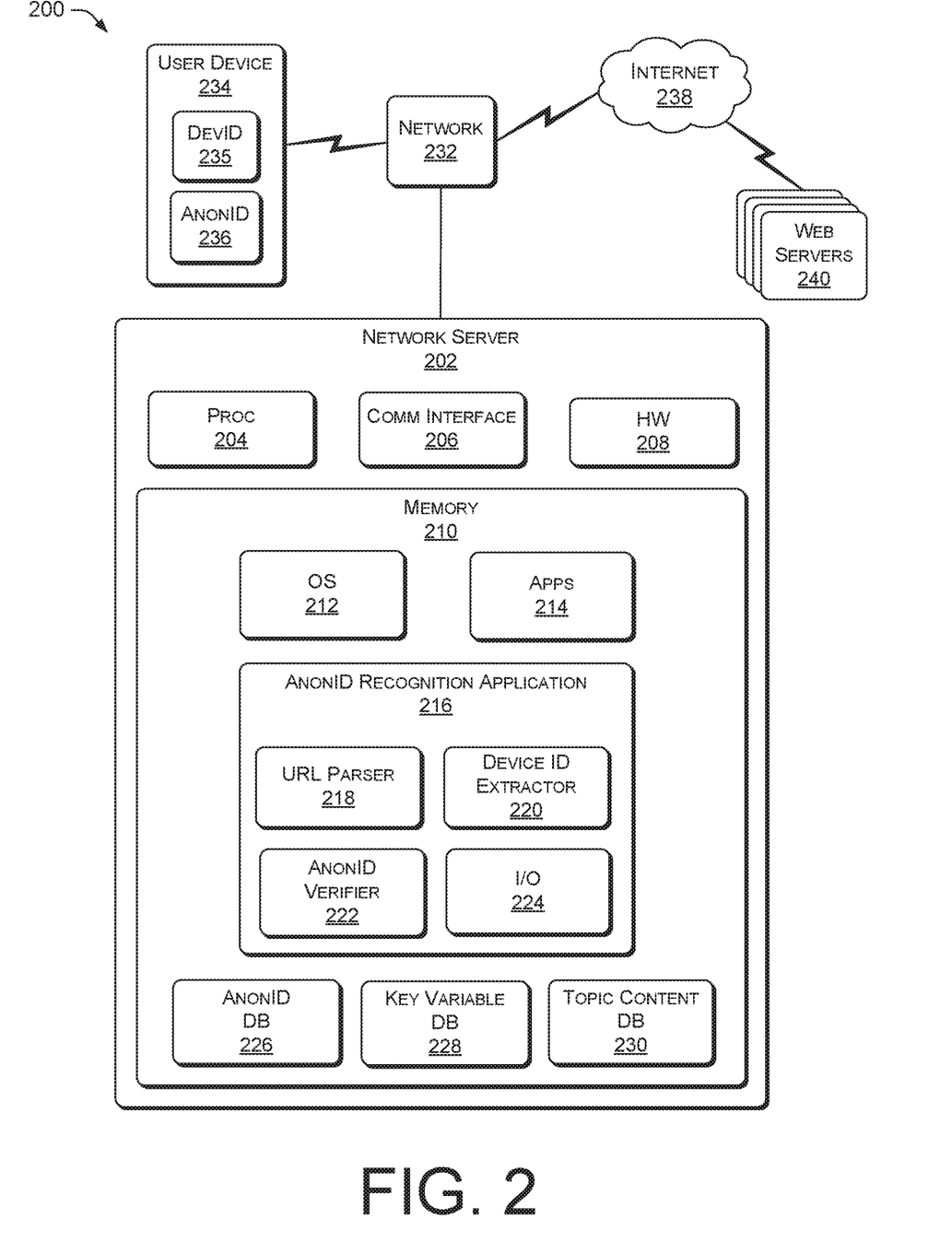
FIG. 2 is a diagram of an example network server environment in accordance with the technologies described herein.

At least one of the servers 118 includes an anonymous identifier recognition application 124, which can be implemented as a software application stored in memory (see FIG. 2). Additionally, apart from the cellular network 102, the cellular network environment 100 includes multiple web servers 128 that are accessed through the Internet 114.

Example Network Server Environment

FIG. 2 is a diagram of an example network server environment 200 in accordance with the technologies described herein. The network server environment 200 includes a network server 202. The one or more of the servers 118 shown in FIG. 1 are examples of the network server 202 in an extended operating environment, in particular, a cellular network environment 100.

The network server 202 includes a processor 204 having electronic circuitry that executes instruction code segments by performing basic arithmetic, logical, control, memory, and input/output (I/O) operations specified by the instruction code. The processor 204 can be a product that is commercially available through companies such as Intel® or AMD®, or it can be one that is customized to work with and control and particular system.

The network server 202 also includes a communications interface 206 and miscellaneous hardware 208. The communication interface 206 facilitates communication with components located outside the network server 202, and provides networking capabilities for the network server 202. For example, the network server 202, by way of the communications interface 206, may exchange data with other electronic devices (e.g., laptops, computers, other servers, etc.) via one or more networks, such as the Internet 114 (FIG. 1) and web servers 118 (FIG. 1). Communications between the network server 202 and other electronic devices may utilize any sort of communication protocol known in the art for sending and receiving data and/or voice communications.

The miscellaneous hardware 208 includes hardware components and associated software and/or or firmware used to carry out device operations. Included in the miscellaneous hardware 208 are one or more user interface hardware components not shown individually—such as a keyboard, a mouse, a display, a microphone, a camera, and/or the like—that support user interaction with the network server 202.

The network server 202 also includes memory 210 that stores data, executable instructions, modules, components, data structures, etc. The memory 210 is be implemented using computer readable media. Computer-readable media includes at least two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

Computer storage media may also be referred to as "non-transitory" media. Although, in theory, all storage media are transitory, the term "non-transitory" is used to contrast storage media from communication media, and refers to a component that can store computer-executable programs, applications, and instructions, for more than a few seconds. In contrast, communication media may embody computer readable instructions, data structures, program modules, or other data in a modulated data signal, such as a carrier wave, or other transmission mechanism. Communication media may also be referred to as "transitory" media, in which electronic data may only be stored for a brief amount of time, typically under one second.

An operating system 212 is stored in the memory 210 of the network server 202. The operating system 212 controls functionality of the processor 204, the communications interface 206, and the miscellaneous hardware 208. Furthermore, the operating system 212 includes components (not shown) that enable the network server 202 to receive and transmit data via various inputs (e.g., user controls, network interfaces, and/or memory devices), as well as process data using the processor 204 to generate output. The operating system 212 can include a presentation component that controls presentation of output (e.g., display the data on an electronic display, store the data in memory, transmit the data to another electronic device, etc.). Additionally, the operating system 212 can include other components that perform various additional functions generally associated with a typical operating system. The memory 210 also stores various software applications 214, or programs, that provide or support functionality for the network server 202, or provide a general or specialized device user function that may or may not be related to the example computing device per se.

The memory 210 also stores an anonymous identifier (AnonID) recognition application 216 that, when executed, identifies and decodes anonymous identifiers, and identifies network devices used with those anonymous identifiers. The anonymous identifier recognition application 216 may be a single block of executable instructions or it may be made up of several components, as shown. The components included in at least one implementation are described below. However, it is noted that in other implementations, more or fewer components may be configured, and that one or more operations attributed to a particular component in the following description may be implemented in one or more other components.

As shown, the anonymous identifier recognition application 216 includes a URL Parser 218, a device identifier extractor 220, an anonymous identifier verifier 222, and an input/output component 224. Also shown in FIG. 2, stored in the memory 210, is an anonymous identifier database 226, a key variable database 228, and a topic content database 230. Although shown apart from the anonymous identifier recognition application 216, the anonymous identifier database 226, a key variable database 228, and a topic content database 230 may be implemented as a part of the anonymous identifier recognition application 216. Conversely, the anonymous identifier database 226, a key variable database 228, and a topic content database 230 may be stored in other memory (not shown), in the network server 202 or in remote locations.

The network server environment 200 also includes a network 232, of which the network server 202 is a part. The network 232 may be a cellular communications network. An exemplary user device 234 is configured to communicate with and by way of the network 232. The exemplary user device 234 is associated with a device identifier 235, which is a value that permanently identifies the user device 234. The user device 234 also stores an anonymous identifier 236, which is a value that identifies the user device 234, but which can be reset or changed by a user of the user device 234.

The network 232 provides connection and communications capabilities with public and private networks, e.g., the Internet 238, and multiple web services 240 accessible via such networks are also included in the network server environment 200. In the environment shown in FIG. 2, the user device 234 can access the Internet 238 and the web servers 240 using services available via the network 232.

Referring back to the components of the anonymous identifier recognition application 216, the URL Parser 218 is configured to monitor communications traffic over the network 232 and discover queries made from the user device 234 to a web server 240 and parse the queries. Character strings in a query string portion of a URL that defines values sent to a website (i.e., a web server 240) are parsed in an attempt to locate a character string that matches a format of a typical anonymous identifier.

One type of anonymous identifier is a mobile advertising identifier, which is a randomly-generated alphanumeric (i.e., hexadecimal) code that is associated with a mobile device. Different mobile device operating systems have different names for mobile advertising identifiers used in their systems. For example, an advertising identifier used in Android® devices is called a "Google® Advertising Identifier" (GAID), while an advertising identifier used in iOS® devices is called an "Identifier for Advertisers" (IDFA or IFA). Such anonymous advertisers are designed to provide advertisers a method to identify a user device without using a permanent device identifier, such as a serial number or a mobile phone number (i.e., a Mobile Station International Subscriber Directory Number (MSISDN)).

IDFA and GAID are hexadecimal numbers and have a specified format of five (5) groups of characters, each group delimited by a hyphen (or an en dash or an em dash, which are similar to hyphens but have slightly different lengths). The five (5) groups of characters include a first group having eight (8) characters, a second group having four (4) characters, a third group having four (4) characters, a fourth group having four (4) characters, and a fifth group having twelve (12) characters. One example of an IDFA/GAID is "6F92048A-8246-4AA4-AC5D-71604681D7EB." It is noted that, although this example refers to a specific type of one kind of anonymous identifier, other formats of advertising identifiers and/or other types of anonymous identifiers may be used with the presently described techniques.

The URL Parser 218 is a code segment configured to recognize a pattern matching a known pattern of an anonymous identifier. When a match is found, the URL Parser 218 stores the potential anonymous identifier in the anonymous identifier database 222. When this occurs, the device identifier extractor 220 code segment identifies the device identifier 235 in the user device 234 and stores the device identifier 235 in the anonymous identifier database 226 so that the device identifier 235 is associated with the potential anonymous identifier recently identified.

There is a possibility that the character string identified as a potential anonymous identifier is not an anonymous identifier. To increase confidence that the potential anonymous identifier is an actual anonymous identifier, the anonymous identifier verifier 222 code segment performs some operations on the potential anonymous identifier. These operations are described in greater detail with respect to subsequent figures.

Generally, techniques described below for verifying that a potential anonymous identifier is an actual anonymous identifier call for leveraging characteristics of certain types of anonymous identifiers to rule out potential anonymous identifiers as being actual anonymous identifiers. The use cases described below, rely on characteristics of the class of anonymous identifiers that are advertising identifiers.

One characteristic of advertising identifiers leveraged in operations to verify that a potential advertising identifier is an actual advertising identifier has been described above, in an operation that identifies a character string formatted similarly to a known format for advertising identifiers. Another characteristic that can be leveraged is that a character string identified as a potential anonymous (or advertising) identifier will likely be related to a "key variable," which may also be referred to simply as a "key." A URL query string (found after the first "?" character in a URL), is represented by key/value pairs (e.g., KEY=VALUE) separated by an ampersand ("&"). The character string in a known format will be found in a value that is associated with a key variable. For example, a URL including "http://search.com/?IDFA=6F92048A-8246-4AA4-AC5D-71604681D7EB . . . " includes a character string in the format of an advertising identifier and that is a value associated with a key variable "IDFA." IDFA is known to be a key variable associated with advertising identifiers. Therefore, the character string is likely to be an advertising identifier.

The key variable database 228 stores multiple instances of key variables known to be associated with a type of anonymous identifier. Continuing with the previous example, "IDFA" is recognized as an advertising identifier because it is stored in the key variable database 228 as a known advertising identifier key variable. The key variable database 228 may store known key variables related to only one type of anonymous identifier (e.g. advertising identifiers), or it may store known key variables related to multiple types of anonymous identifiers, grouped according to type. In the present example, the key variable database 228 stores multiple instances of known advertising identifiers, examples of which include, but are not limited to: IDFA, UVID, UUID, UDID, IFA, GAID, google_aid, google_aid_raw, google_aid_sha1, google_aid_md5, google_aid-lower, google_aid_sha1_lower, google_aid_md5_lower, google_aid_alphanumeric, google_aid_alphanumeric_lower, AAID, google_aid_alphanumeric_lower_sha1, google_alphanumeric_lower_md5, android_id, android_id-sha1, ios_ifa, open_udid, etc.

Continuing with the example of advertising identifiers, another characteristic of advertising identifiers used with mobile cellular devices is that it is highly unlikely that the same advertising identifier will be associated with more than one device identifier. Since an advertising identifier is randomly generated, there is a possibility that this will be true, but it is so unlikely that it can be relied on to filter potential advertising identifiers. Therefore, if a potential advertising identifier is found in the anonymous identifier database 226 and it is associated with a device identifier that is different from the device identifier 235 that transmitted the potential advertising identifier, then the potential advertising identifier is not verified as an actual advertising identifier.

Yet another characteristic of advertising identifiers that can be leveraged to validate potential advertisement identifiers is that multiple advertising identifiers may be associated with the same device identifier. This is because advertising identifiers can be changed by a user. Similar to the characteristic exploited above, where the same advertising identifier cannot be associated with more than one device identifier, if at least a second advertising identifier is associated with the device identifier 235, then if multiple device identifiers are associated with the second advertising identifier, the potential advertising identifier is not verified to be an actual advertising identifier.

The URL parser 218 is further configured to infer topics of interest from information contained in URLs transmitted from the user device 234 via the network 232. This can be done in any of several ways known in the art. In some cases, a host name in a URL may imply one or more topics. For example, if the URL is directed to "Nike.com®," then it can be inferred that the user of the user device 234 may be interested in sportswear and/or sporting equipment. In another method, search terms included in a URL may indicate particular interests of the user. For example, if the user sends a search request to "Google.com®," and includes the terms "Bluetooth®" and "speaker," then it can be inferred that the user is in the market for a Bluetooth® speaker.

When topics of interests are identified, they are associated with the device identifier 235 of the user device 234 that transmitted the URL. This may be done by storing topics and associating them with device identifiers in the anonymous identifier database 226. In at least one implementation, specific content related to topics of interest may be stored in the topic content database 230. Such content may be information about certain topics related to products, product usage, maps, services, etc. It is noted that the topic content database 230 may be stored remote from the network server 202. For example, it may be stored with a server of an entity that serves advertising content.

Further functionality of the network server 202 and its component features is described in greater detail, below, with respect to examples of methodological implementations of the novel techniques described and claimed herein.

Example Methodological Implementation—Identifying User Intention

Figure 3:
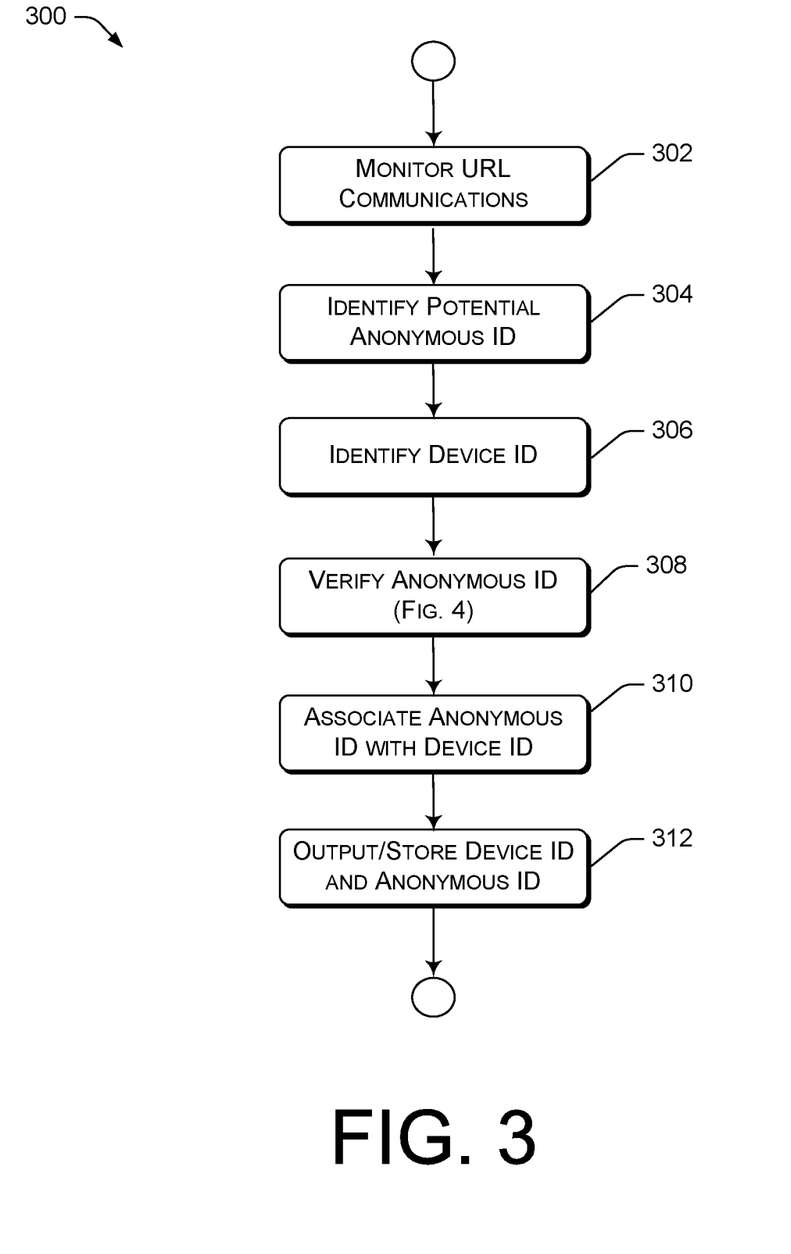
FIG. 3 is a flow diagram of an example methodological implementation for ascertaining network devices used with anonymous identifiers.

FIG. 3 is a flow diagram 300 that depicts a methodological implementation of at least one aspect of the techniques for ascertaining network devices used with anonymous identifiers. In the following discussion of FIG. 3, continuing reference is made to the elements and reference numerals shown in and described with respect to the network server environment 200 and network server 202 of FIG. 2.

In the following discussion related to FIG. 3, certain operations may be ascribed to particular system elements shown in previous figures. However, alternative implementations may execute certain operations in conjunction with or wholly within a different element or component of the system(s). Furthermore, to the extent that certain operations are described in a particular order, it is noted that some operations may be implemented in a different order to produce similar results.

The discussion relative to FIGS. 3 through 6 may refer advertising identifiers, which are a particular example of anonymous identifiers. Such discussion continues one or more examples previously discussed. However, it is noted that the techniques described are not limited to advertising identifiers and may be used with any category of anonymous identifier that fits within the bounds of the discussion. In at least some instances, reference to an "advertising" identifier is the same as reference to an "anonymous" identifier, and vice-versa.

At block 302, the URL Parser 204 code segment in the anonymous identifier recognition application 216 monitors network 232 traffic between the user device 234 and one or more web servers 240. The input/output component 224 and the communications interface 206 may be utilized for inputting the traffic data stream. Depending on the implementation, all traffic over the network 232 to and from the user device 234 may be monitored or monitoring may occur only when a URL is detected in some other fashion. For instance, when a network device transmits an IP location in a navigation operation (e.g. 63.147.242.179), network components direct the traffic to a web server associated with the IP location. The monitoring may occur when an operation such as this is detected. Other techniques may also be used.

The URL Parser 204 parses traffic to search for a character string pattern that is similar to a format of a known anonymous identifier. As previously discussed in the example of an advertising identifier, a known format is "xxxxxxxx-xxxx-xxxx-xxxx-xxxxxxxxxxxx," wherein "x" represents a variable hexadecimal character. When a character string matches such a format, the URL Parser 204 identifies the character string as a potential anonymous identifier (block 304).

When a potential anonymous identifier is identified, the device identifier extractor 220 code segment locates the device identifier 235 associated with the user device 234 at block 306. At this time, the potential anonymous identifier and the device identifier 235 can be stored in the anonymous identifier database 226 and associated with each other and made available for further operations. However, in at least one alternate implementation, the potential anonymous identifier and the device identifier 235 may be stored in a different memory location pending subsequent processing.

The location of the potential anonymous identifier and the device identifier 235 is not determinative to the result of any subsequent operation.

At block 308, operations are performed in an attempt to verify that the detected potential anonymous identifier is truly an anonymous identifier of the type sought. Some details of such operations have been previously discussed. Additional details of the operations are discussed in greater detail, below, with respect to FIG. 4.

If the potential anonymous identifier is verified as an actual anonymous identifier 236, then at block 310, the verified anonymous identifier 236 is associated with the device identifier 235 in some manner, such as by strategic storing in a database table. At block 312, the device identifier 235 and the anonymous identifier 236 associated therewith are transmitted via the input/output component 224. The transmission may be to store the associated data, or it may be to transmit the device identifier 235 and the associated anonymous identifier 236 for further processing by another component in the network server 202 or at a remote location operated by an entity other than an entity operating the network server 202. In the example of an advertising identifier, the data may be transmitted to a commercial entity that provides content to user devices or other entity.

Example Methodological Implementation for Verifying Anonymous Identifiers

Figure 4:
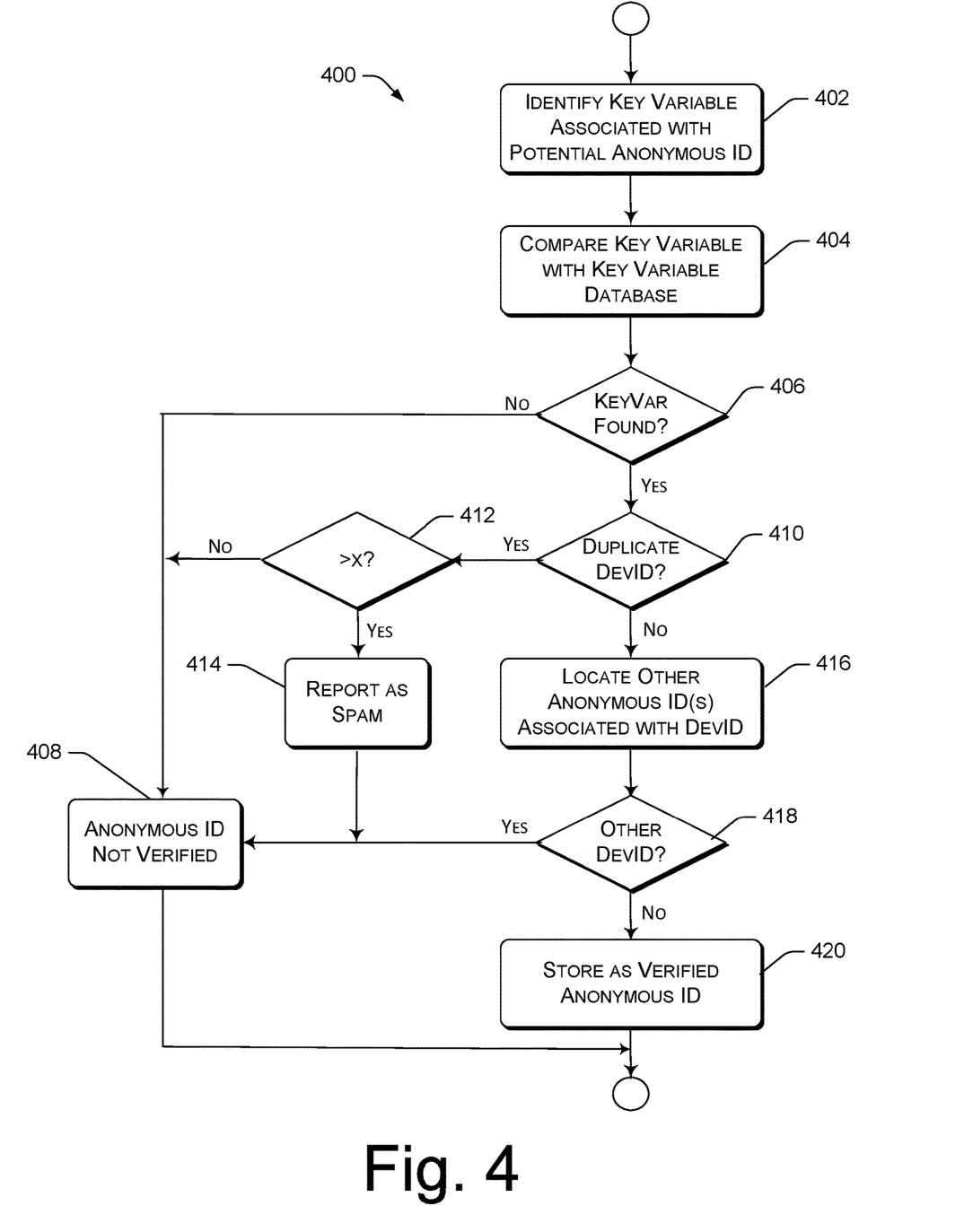
FIG. 4 is a flow diagram of an example methodological implementation for verifying that character strings are anonymous identifiers.

FIG. 4 is a flow diagram 400 that depicts a methodological implementation of at least one aspect of the techniques for ascertaining network devices used with anonymous identifiers. More particularly, the flow diagram depicts an example methodological implementation for verifying that character strings are anonymous identifiers. In the following discussion of FIG. 4, continuing reference is made to the elements and reference numerals shown in and described with respect to the network server environment 200 and network server 202 of FIG. 2.

In the following discussion related to FIG. 4, certain operations may be ascribed to particular system elements shown in previous figures. However, alternative implementations may execute certain operations in conjunction with or wholly within a different element or component of the system(s). Furthermore, to the extent that certain operations are described in a particular order, it is noted that some operations may be implemented in a different order to produce similar results.

At block 402, the anonymous identifier 222 (FIG. 2) code segment receives information from the URL Parser 218. The information includes a character string that is in the format of a known anonymous identifier, plus a key variable. In a typical URL query string, a key variable associated with a key value is in the format "KEY={value}, where "KEY" is the key variable and "{value}" is a value assigned to the key variable. When a character string that is identified as having a format similar to a known anonymous identifier follows an equals sign ("="), then a term positioned before the equals sign is extracted as a key variable. At block 402, that extracted term is identified as a key variable. Although an equals sign is commonly used, it is possible that in an alternative implementation, a different operator may be used. If so, it is noted that the different operator may be used in accordance with the present techniques.

At block 404, the key variable is compared to key variables stored in the key variable database 228. As previously noted, the key variable database 228 stores one or more terms known to denote anonymous identifiers, such as "IDFA," "UVID," "UUID," "IFA," etc. If the key variable extracted from the URL is not found in the key variable database 228 ("No" branch, block 406), the character string is not verified as an anonymous identifier (block 408).

If the key variable extracted from the URL is found in the key variable database 228 ("Yes" branch, block 406), then a confidence that the extracted character string is an anonymous identifier is increased. In one or more alternate implementations, the character string may be verified as an anonymous identifier at this point. However, greater confidence can be achieved by taking additional steps described below.

At block 410, the character string that is the potential anonymous identifier is compared to the anonymous identifier database 226 to determine if an identical character string (i.e. anonymous identifier) is stored in the anonymous identifier database 226. If so, then the device identifier 235 associated with the user device 234 that transmitted the URL query string currently being parsed is compared with a device identifier associated with a stored identical character string. If a duplicate device identifier is found ("Yes" branch, block 410), then the character string is not verified as an anonymous identifier. This is because of the high likelihood that an anonymous identifier will only be associated with a single device identifier.

In at least one implementation, the number of occurrences of duplicate device identifiers is determined (blocks 412 and 414). If a low number of duplicate device identifiers are found, then it could be the result of the anonymous identifier not being one that is uniquely associated with a single device identifier. However, if a large number of duplicate device identifiers are found, it could mean that the URL is potentially malicious traffic, such as spam.

One way that spammers operate is to copy a URL from network traffic, then insert the URL into network traffic of other network devices. When the URL is copied, any anonymous identifier that is included in the URL is copied as well, and when it is inserted into traffic from a different device, the same anonymous identifier appears to be related to the different device. For instance, if the anonymous identifier is an advertising identifier, spammers may steal and reuse the URL to put information in a location where an advertisement might normally go.

At block 412, a determination is made as to whether the number of duplicates is significant regarding spam detection. This number is an implementation feature that can vary, but an example of such a number is ten (10). In other words, if ten (10) or more duplicate device identifiers are found to be associated with the character string that is a potential anonymous identifier ("Yes" branch, block 412), then the URL is reported as spam at block 414. It is noted that there need not be more than a single duplicate to suspect possible spamming. In other words, the implementation may include a duplicate test value of two rather than ten. In any suspected case, further investigation can be made to determine if, in fact, a spamming operation is occurring.

If the number of duplicates is less than the specified number, e.g. ten (10) ("No" branch, block 412), then the character string is not verified as an anonymous identifier (block 408).

If a duplicate device identifier is not found ("No" branch, block 410), then confidence that the character string is an anonymous identifier is increased. Again, the process may end here, but may continue as described below if further verification is desired.

Although an anonymous identifier may only be associated with a single device (i.e. device identifier), the converse is not necessarily true. Since a user can change an anonymous identifier (such as an advertising identifier) on the user device 234, the anonymous identifier database 226, which stores a history of detected anonymous identifiers, may include a device identifier that has more than one anonymous identifiers associated with it. Therefore, additional anonymous identifiers associated with the device identifier 235 should be checked in a similar manner described with regard to block 410 to determine if such an additional anonymous identifier is associated with a different device identifier.

At block 416, a comparison is made between the device identifier 235 and stored device identifiers in the anonymous identifier database 226. If the device identifier 235 is found in the anonymous identifier database 226, then an anonymous identifier associated with the device identifier in the anonymous identifier database 226 is compared to other anonymous identifiers stored in the anonymous identifier database 226. If an identical anonymous identifier is found, an associated device identifier (from the anonymous identifier database 226) is compared with the device identifier 235. If there is not an exact match, it means that there is another device identifier associated with an anonymous identifier that matches the parsed character string ("Yes" branch, block 418) and the character string that is a potential anonymous identifier is not verified as an actual anonymous identifier (block 408).

If there is a match, it means that a duplicate instance of the anonymous identifier that was found to be associated with the device identifier is associated with the same device identifier ("No" branch, block 418). At that point, there is a very high confidence that the parsed character string is an anonymous identifier, and the parsed character string is verified as an anonymous identifier. The verified anonymous identifier is then stored in the anonymous identifier database 226, where it is associated with the device identifier 235 (block 420).

As the preceding operations are performed a number of times, the anonymous identifier database 226 will grow. Limitations on such growth may be implemented. For example, if no active reduction operations are taken, the anonymous identifier database 226 may be configured to have a maximum size. When the maximum size is reached, reductions may be automatically made, such as deleting entries that are older than a specified time or simply deleting the oldest entry when a new entry is made after the maximum size has been reached. Such a reduction of the anonymous identifier database 226 can vary between implementations, and depends on goals and/or characteristics of anonymous identifiers on which the operations are focused. A maximum size can be a memory size of the database, a maximum total number of entries, a maximum number of entries for the same device identifier, etc.

Methodological Implementation for Identifying Topics of Interest

Figure 5:
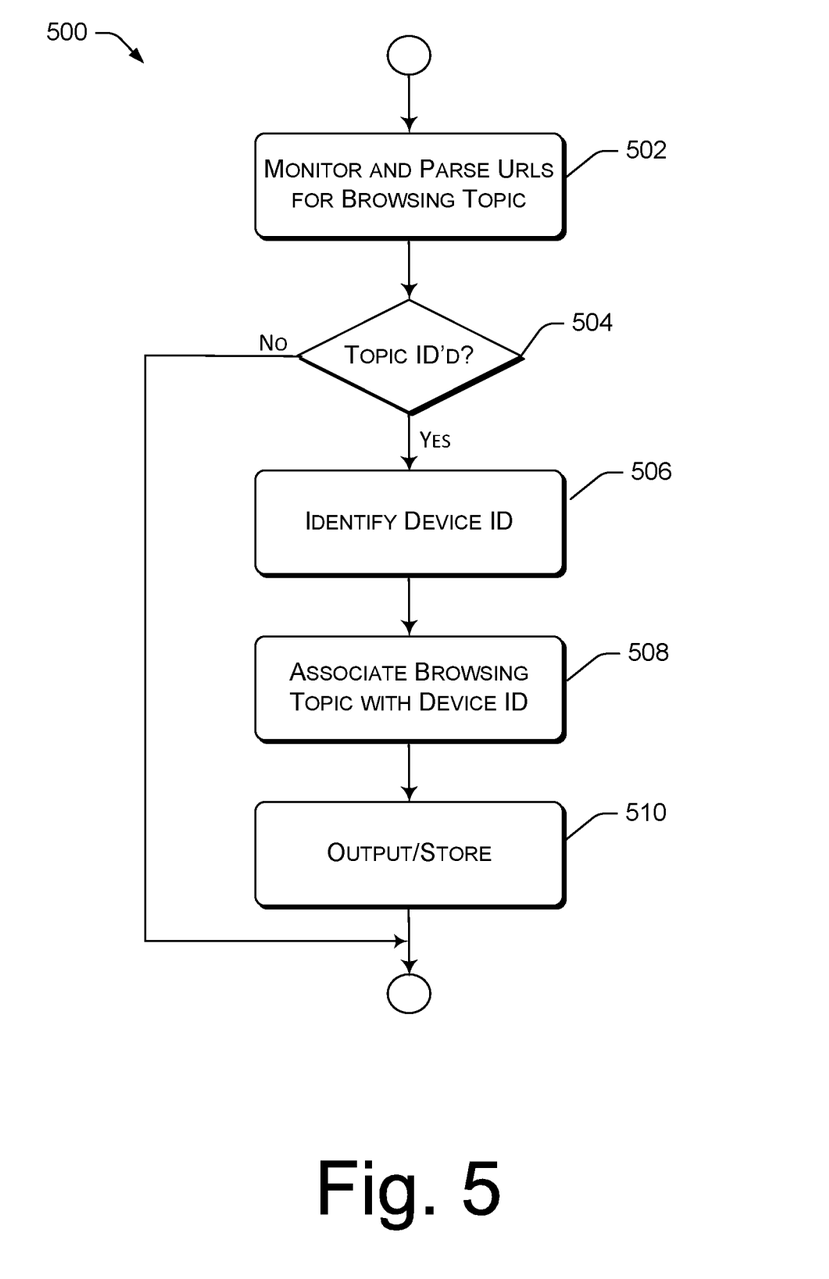
FIG. 5 is a flow diagram of an example methodological implementation for identifying browsing topics related to device identifiers.

FIG. 5 is a flow diagram of an example methodological implementation for identifying browsing topics related to device identifiers. In the following discussion of FIG. 4, continuing reference is made to the elements and reference numerals shown in and described with respect to the network server environment 200 and network server 202 of FIG. 2.

In the following discussion related to FIG. 5, certain operations may be ascribed to particular system elements shown in previous figures. However, alternative implementations may execute certain operations in conjunction with or wholly within a different element or component of the system(s). Furthermore, to the extent that certain operations are described in a particular order, it is noted that some operations may be implemented in a different order to produce similar results.

After performing operations described in relation to FIGS. 3 and 4, the anonymous identifier database 226 contains a list of anonymous identifiers that have been associated with particular user devices. This information can be useful when an entity wants to use the information to identify users of particular devices with regard to a characteristic associated with the anonymous identifier.

One example of a use of the data contained in the anonymous identifier dataset 226 is when the anonymous identifiers are advertising identifiers. In that case, the anonymous identifier database 226 contains a list of device identifiers and advertising identifiers associated therewith. In such a case, it is useful to have information associated with the device identifiers that indicates topics of interest to users associated with the device identifiers so that advertising content related to those topics may be directed to users of devices identified by the device identifiers. If such techniques are implemented responsibly, a device user will not receive any more served advertisements than he normally would, but the advertisements served to the user will more likely be of interest to the user. At least one implementation of this technique is described below, with regard to FIGS. 5 and 6.

At block 502, network traffic is monitored to determine topics of interest to a user of the user device 234. Identifying browsing topics may be done by parsing URLs transmitted from the user device 234. Several techniques for doing this are known in the art, and any of them may be used for this purpose. For example, a host server name in a URL may be known to relate to one or more browsing topics, or search terms in a URL query string may identify one or more browsing topics.

If a browsing topic is identified ("Yes" branch, block 504), then the device identifier 235 is identified and extracted at block 506. At block 508, the browsing topic is associated with the device identifier 235, and the browsing topic and associated device identifier 235 are output and/or stored at block 510. If a browsing topic is not identified ("No" branch, block 504), then the traffic monitoring continues at block 502.

The output and/or storing operation (block 510), may be accomplished in at least one of several ways. One way is to store the device identifier 235 and the related browsing topic in the anonymous identifier database 226. This information may be stored regardless of whether the device identifier 235 is already stored in the anonymous identifier database 226 and associated with an anonymous identifier. Then, if and when an anonymous identifier is identified and associated with the device identifier, the anonymous identifier can be stored relative to the device identifier already in the anonymous identifier database 226.

In at least one alternate implementation, the device identifier 235 and the identified browsing topic(s) can be stored in a separate database, either within the network server 202 or in a remote location. In at least one implementation, the anonymous identifier recognition application 216 does not store the device identifier and the associated browsing topic(s), but transmits them to a remote entity for further processing.

Figure 6:
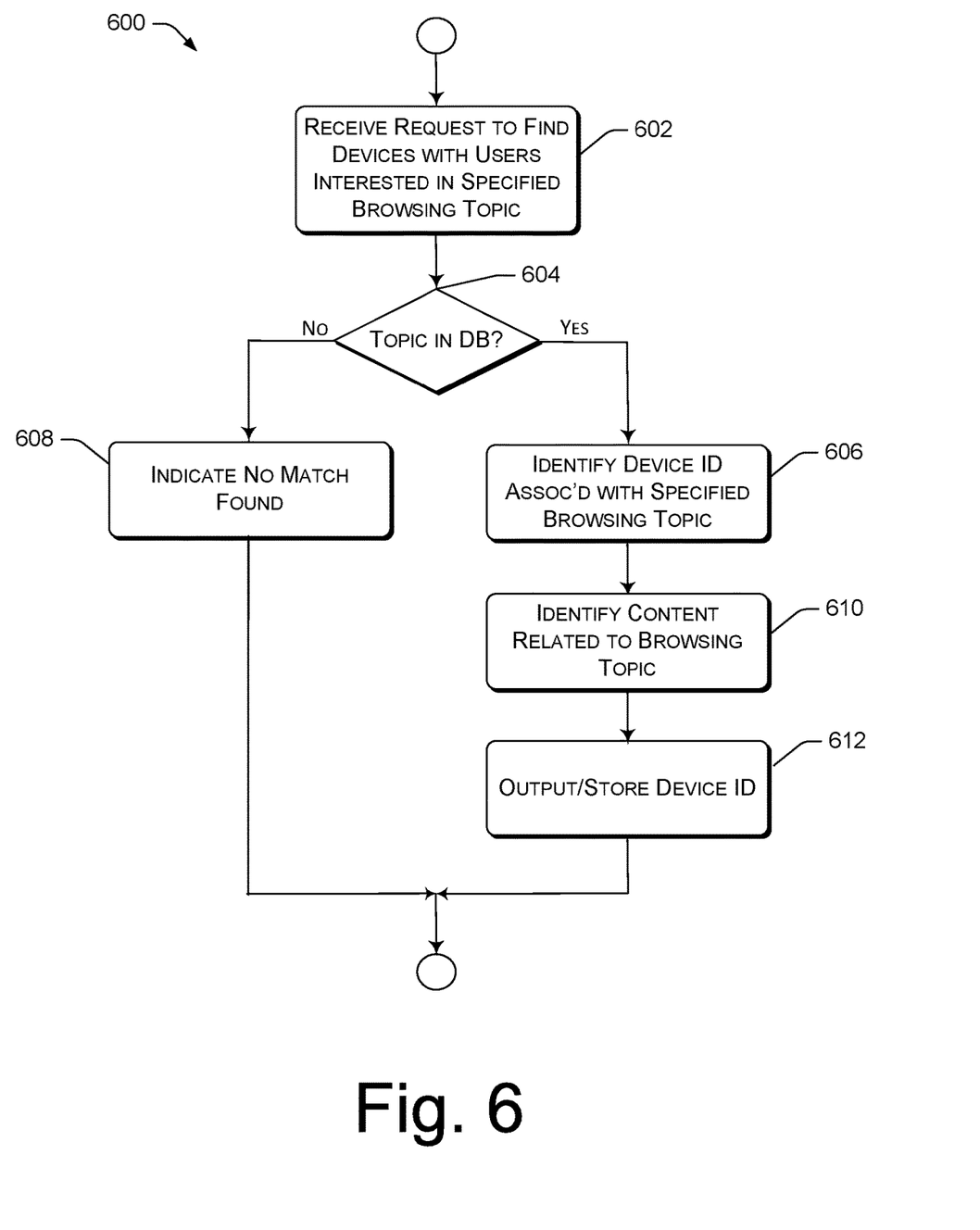
FIG. 6 is a flow diagram of an example methodological implementation for ascertaining network devices related to identified browsing topics.

According to the presently described implementation, the identified browsing topic(s) is/are stored in the anonymous identifier database 226, where the browsing topic(s) can be searched to identify devices (i.e. device identifiers) associated with a particular browsing topic, as shown in FIG. 6.

Regarding FIG. 6, at block 602 the network server 202 receives a request to find devices associated with users who are interested in a specified browsing topic. For example, a request may be received to find devices associated with users who are interested in "skis." The browsing topic "skis" may have been identified from a search term in a URL query string, or it may have been derived from a server host name identified in a URL, such as "skisareus.com."

At block 604, browsing topics stored in the anonymous identifier database 226 are searched for the term "skis." If the browsing topic (e.g., "skis") is found ("Yes" branch, block 604), then a device identifier associated with the browsing topic is identified at block 606. If the browsing topic is not found in the anonymous identifier database 226 ("No" branch, block 604), then an indication that no match was found is provided in response to the request at block 608.

At block 610, content related to the browsing topic is identified in the topic content database 230. Such content has previously been identified as related to certain topics and stored in the topic content database 230. In an advertising scenario, the content is some sort of advertisement. It is noted that this step may be performed by the network server 202 or by a different entity.

At block 612, the device identifier(s) found to relate to the browsing topic are output to storage, to a local entity, or to a remote entity. As a result, the requester is able to determine devices associated with users interested in the specified browsing topic. If the anonymous identifier recognition application 216 has also performed block 612 to identify topic content related to the browsing topic, then that content is transmitted with the device identifier(s). In at least one implementation, topic content is transmitted directly to each user device associated with the device identifier(s). In the case of a cellular network with cellular user devices, the device identifier can be the user device phone number (the MSISDN of the device), and the topic content can be sent to the phone number, such as in a text message.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
  monitoring one or more URL transmitted by a cellular device over a cellular network;
  identifying a character string in a URL transmitted by the cellular device as a potential anonymous identifier of the cellular device;
  identifying a first device identifier that uniquely identifies the cellular device;
  identifying in the character string a value of a key variable that is associated with a key/value pair of the character string;
  comparing the key variable associated with the key/value pair with key variables stored in a key variable database;
  determining, as a result of the comparison, that the key variable matches a key variable in the key variable database;
  verifying the potential anonymous identifier as a verified anonymous identifier that identifies the cellular device in accordance with determining that the identified key variable matches a key variable in the key variable database;
  associating the verified anonymous identifier with the first device identifier in accordance with the verification; and
  storing the verified anonymous identifier and the first device identifier such that the verified anonymous identifier and the first device identifier are associated with each other.

2. The method as recited in claim 1, wherein the identifying a character string as a potential anonymous identifier further comprises identifying characters that are stored in a format predetermined for anonymous identifiers.

3. The method as recited in claim 1, further comprising:
  determining whether the potential anonymous identifier is associated with a second device identifier,
  wherein the verifying the potential anonymous identifier as a verified anonymous identifier depends on determining that the potential anonymous identifier is not associated with the second device identifier.

4. The method as recited in claim 1, further comprising:
  identifying a topic from one or more URL navigated to by the cellular device; and
  associating the topic with the first device identifier.

5. The method as recited in claim 4, further comprising:
  identifying content related to the topic; and
  causing at least a portion of the content to be transmitted to the cellular device in accordance with the identification of the content as being related to the topic and the association of the topic with the first device identifier.

6. The method as recited in claim 1, wherein the identifying a character string as a potential anonymous identifier further comprises identifying five groups of characters in the character string and identifying the characters stored in each of the five groups, where adjacent groups are separated by a delimiting character, and the groups consist of: a first group of eight hexadecimal characters, a second group of four hexadecimal characters, a third group of four hexadecimal characters, a fourth group of four hexadecimal characters, and a fifth group of twelve hexadecimal characters.

7. A system, comprising:
  a processor;
  memory that includes one or more electronic storage media components for storing code instructions that are executable on the processor;
  a communications interface configured to enable communications with a network;
  an anonymous identifier database configured to include at least one device identifier and one anonymous identifier that is associated with the device identifier, the device identifier being a value that uniquely identifies a communications device enabled to communicate over the network, and the anonymous identifier being a value assigned to the communications device; and
  an anonymous identifier recognition application stored in the memory, including:
    a URL parser code segment configured to:
      access a URL transmitted over the network from the communications device, and
      detect a character string having a predetermined anonymous identifier format;
    a device identifier extractor code segment configured to identify and extract the device identifier from the communications device and store the device identifier in the anonymous identifier database;

an anonymous identifier verifier code segment configured to verify the detected character string as a verified anonymous identifier assigned to the communications device in accordance with the identification of the character string as matching the predetermined anonymous identifier format; and an input/output code segment configured to store a verified anonymous identifier with the device identifier of the communication device in the anonymous identifier database such that the verified anonymous identifier and the device identifier are associated with each other.

8. The system as recited in claim 7, further comprising a key variable database configured to store key variables used with anonymous identifiers; wherein:

the URL parser code segment is further configured to identify in the character string a value of a key variable associated with a key/value pair of the character string having the predetermined anonymous identifier format; and the anonymous identifier verification code segment is further configured to:

compare the key variable associated with the key/value pair with key variables stored in a key variable database;

determine, as a result of the comparison, that the key variable matches a key variable in the key variable database;

verify the detected character string as a verified anonymous identifier assigned to the communications device dependent on the key variable matching a key variable in the key variable database.

9. The system as recited in claim 7, wherein:
the device identifier is a first device identifier;
the anonymous identifier verifier code segment is further configured to verify the detected character string as a verified anonymous identifier assigned to the communications device dependent on the detected character string being not associated with a second device identifier in the anonymous identifier database.

10. The system as recited in claim 7, wherein:
the device identifier is a first device identifier; and
the anonymous identifier verifier code segment is further configured to determine if the first device identifier has an associated anonymous identifier listed in the anonymous identifier database and, if so, to verify the detected character string as a verified anonymous identifier if such an associated anonymous identifier is not also associated with a second device identifier.

11. The system as recited in claim 7, further comprising a topic content database that associates a topic with specified content;
wherein:
the URL parser code segment is further configured to identify a topic from at least one URL transmitted by the communications device; and
the input/output code segment is further configured to associate the identified topic with the device identifier in the anonymous identifier data store such that locating a desired topic identifies the device identifier and the anonymous identifier that are associated with the communications device.

12. The system as recited in claim 11, wherein the anonymous identifier recognition application is further configured to transmit the specified content to the communications device in accordance with the identification of the content as being related to the topic and the association of the topic with the first device identifier.

13. The system as recited in claim 7, wherein:
the network further comprises a cellular telephone network; and
the communications device further comprises a cellular network device.

14. One or more non-transitory computer-readable storage media including computer-executable instructions that, when executed by a computer, perform the following operations:

receiving a URL transmitted by a cellular device over a cellular network;

identifying a URL character string transmitted by the cellular device over the cellular network that matches a predetermined anonymous identifier format;

verifying the identified URL character string as an anonymous identifier in accordance with the identification of the URL character string as matching the predetermined anonymous identifier format;

associating the verified identified URL character string with a first device identifier that uniquely identifies the cellular device in accordance with the verification;

identifying a subject from one or more URL navigated to by the cellular device;

associating the subject with the first device identifier;
identifying content related to the subject; and
associating the content related to the subject with the first device identifier, the verified anonymous identifier, or both.

15. The one or more non-transitory computer-readable storage media as recited in claim 13, further comprising computer-executable instructions that, when executed by a computer, perform the following additional operations:

identifying in the character string a value of a key variable associated with a key/value pair of the character string;

comparing the key variable associated with the key/value pair with key variables stored in a key variable database; and determining, as a result of the comparison, whether the key variable matches a key variable in the key variable database, wherein the verifying the detected character string as a verified anonymous identifier depends on determining that the key variable is included in the key variable database.

16. The one or more non-transitory computer-readable storage media as recited in claim 13, further comprising computer-executable instructions that, when executed by a computer, perform the following additional operations:

determining whether the detected character string is associated with a second device identifier, wherein the verifying the detected character string as a verified anonymous identifier depends on verifying that the detected character string is not associated with a second device identifier.

17. The one or more non-transitory computer-readable storage media as recited in claim 13, further comprising computer-executable instructions that, when executed by a computer, perform the following additional operations:

determining that the first device identifier is associated with an existing anonymous identifier; and determining if the existing anonymous identifier is associated with a second device identifier;

wherein the verifying the detected character string as a verified anonymous identifier depends on determining that the existing anonymous identifier is not associated with a second device identifier.

18. The one or more non-transitory computer-readable storage media as recited in claim 13, further comprising computer-executable instructions that, when executed by a computer, perform the additional operation of causing at least a portion of the content to be transmitted in response to a request that includes the anonymous identifier.

19. The method of claim 1, wherein:
the key variable database stores key variables related to multiple types of anonymous identifiers, grouped according to type, each key variable being related to only one type of anonymous identifier.

20. The system of claim 8, wherein:
the key variable database stores key variables related to multiple types of anonymous identifiers, grouped according to type, each key variable being related to only one type of anonymous identifier.

* * * * *